United States Patent [19]
McFarlane et al.

[11] Patent Number: 6,013,880
[45] Date of Patent: Jan. 11, 2000

[54] MATERIAL SUPPORTING APPARATUS

[75] Inventors: Claude L. McFarlane, Madison; Daniel R. Brauer, Beloit, both of Wis.

[73] Assignee: Knight Manufacturing Corp., Brodhead, Wis.

[21] Appl. No.: 08/871,426

[22] Filed: Jun. 9, 1997

[51] Int. Cl.⁷ .................................................. G01G 19/08
[52] U.S. Cl. .......................... 177/139; 414/21; 296/35.1
[58] Field of Search .............................. 296/35.1; 414/21; 177/253, 255, 136, 139

[56] References Cited

U.S. PATENT DOCUMENTS

| | | | |
|---|---|---|---|
| 1,402,606 | 1/1922 | Hemingway | 177/136 |
| 2,109,460 | 3/1938 | Brasher | 414/21 |
| 2,959,302 | 11/1960 | Cawood | 414/21 |
| 3,321,035 | 5/1967 | Tarpley | 177/255 |
| 3,580,343 | 5/1971 | Hogue | 177/136 |
| 3,971,451 | 7/1976 | Norberg | 414/21 |
| 4,483,404 | 11/1984 | Weihs | 177/255 |
| 4,568,239 | 2/1986 | Sims | 414/21 |
| 5,429,436 | 7/1995 | Stone | 414/21 |
| 5,738,479 | 4/1998 | Glen et al. | 414/21 |

*Primary Examiner*—Joseph D. Pape
*Attorney, Agent, or Firm*—David J. Archer

[57] ABSTRACT

A material supporting apparatus is disclosed for supporting and permitting delivery of the materials. The apparatus includes a chassis having a first and a second end. A container is mounted upon the chassis and a stabilizing device is interconnected between the container and the chassis. The stabilizing device is disposed between the container and the chassis for stabilizing the container relative to the chassis. A restraining mechanism extends between the chassis and the container for permitting limited vertical movement of the container relative to the chassis. Also, a weight sensing arrangement is disposed between the container and the chassis for sensing the weight of the container and the materials added thereto and for determining therefrom the weight of the materials within the container. Additionally, a coupling device is disposed between the chassis and the container and positioned remote from the stabilizing device for assisting the stabilizing of the container relative to the chassis.

12 Claims, 3 Drawing Sheets

MATERIAL SUPPORTING APPARATUS

BACKGROUND OF THE INVENTION

1. Field of the Invention

The present invention relates to a material supporting apparatus. More specifically, the present invention relates to a material supporting apparatus such as a mixer for mixing feed for livestock, seed, fertilizers and the like.

2. Information Disclosure Statement

Mixers are used for mixing hay and silage together with other nutrients including animal feed supplements and the like. Also, mixers are used for mixing seed and fertilizers.

In raising cattle and other livestock, it is imperative that the correct amounts of animal feed be supplied to the live stock in order to optimize meat and dairy production and the return on capital investment.

Consequently, mixers for animal feed and other materials often incorporate therein means for measuring the amounts of feed being mixed and for permitting the addition thereto of controlled quantities of various animal feed supplements and additives.

In recent years, weighing transducers have been used for measuring the weight of the feed. Such an arrangement includes weighing the feed container together with the feed therein and determining therefrom, the weight of the actual feed being supplied.

Typically, such weighing transducers or load cells are located at each corner of the feed container. These weighing transducers which are located between the container and the supporting chassis measure the loading between the container and the supporting chassis.

In the aforementioned arrangement there is a need for the container to "float" on top of the chassis. Consequently, there has always been a need to stabilize the container against "skewing" thereof relative to the chassis and weighing transducers disposed therebetween. Such skewing would particularly include linear movement in a generally horizontal plane between the container and the chassis.

In the prior art, in order to stabilize the container and to restrain movement of the container during transportation or mixing, arms have been provided. Such arms extend between the chassis and the container for stabilizing the container.

More specifically, a minimum of three arms have been required in order to prevent skewing or misalignment of the container relative to the supporting chassis.

Moreover, some mixers have utilized two arms at each corner thus requiring a total of eight arms including associated anchors and swivel joints.

The aforementioned minimum of three arms have been provided to prevent skewing of the container while freely permitting vertical movement of such container to accomplish weighing thereof.

In one prior art arrangement, a first pair of arms is disposed adjacent to one corner of the container with one of the arms being pivotally secured to one side of the chassis and the opposite end of the arm being pivotally secured to the container adjacent to that corner.

The second arm was pivotally secured at 90 degrees to the first arm at one end of the chassis while the other end of the second arm was pivotally secured to the container adjacent to the same corner.

The same procedure was applied to the diagonally opposite corner for securing the same by means of a second pair of arms.

In the aforementioned manner, the container has been secured against skewing thereof. Also, sensing of the weight of the feed or the like by means of weighing transducers disposed at the respective corners was permitted.

Clearly, the manufacture of the aforementioned prior art multiplicity of arms has been rather complex thus increasing the cost of the apparatus. Also, the prior art arrangements have involved considerable maintenance costs.

The present invention overcomes the aforementioned problems by the provision of a material supporting apparatus which only requires one arm in conjunction with a coupling means to prevent the aforementioned skewing of the container. Additionally, the material supporting apparatus according to the present invention provides an accurate measurement of the weight of the material within the container.

Therefore, it is a primary objective of the present invention to provide a material supporting apparatus which overcomes the problems associated with the prior art devices and which makes a considerable contribution to the art of supporting and weighing feedstuffs or other material.

Another object of the present invention is the provision of a simplified means for preventing skewing of a container relative to a chassis in a material supporting apparatus while permitting weighing of material within a container.

Other objects and advantages of the present invention will be readily apparent to those skilled in the art by a careful consideration of the written description contained hereinafter taken in conjunction with the annexed drawings which illustrate a preferred embodiment of the present invention.

SUMMARY OF THE INVENTION

The present invention relates to a material supporting apparatus for supporting and permitting delivery of feed for livestock or other materials. The apparatus includes a chassis having a first and a second end.

A load container is mounted upon the chassis, and a stabilizing device is interconnected between the container and the chassis. The stabilizing device is disposed between the container and the chassis for stabilizing the container relative to the chassis.

Additionally, a restraining mechanism extends between the chassis and the container for permitting limited vertical movement of the container relative to the chassis.

Also, a weight sensing means is disposed between the container and the chassis for sensing the weight of the container and the feed or other material added thereto and for determining therefrom the weight of the feed or other materials within the container.

Additionally, coupling means are provided between the chassis and the container, the coupling means being disposed remote from the stabilizing device.

In a more specific embodiment of the present invention, the chassis is of generally rectangular configuration, the chassis defining a first side and defining a second side disposed opposite to the first side.

Additionally, at least one pair of wheels is disposed between the ends of the chassis with the at least one pair of wheels including at least a first wheel disposed adjacent to the first side of the chassis and at least a second wheel disposed adjacent to the second side of the chassis for enhancing the maneuverability of the apparatus.

The apparatus further includes a tongue extending from the first end of the chassis. The arrangement is such that when the tongue is connected to a tractor, transportation of the chassis is permitted.

Also, the container is of a generally rectangular configuration having a forward end and a rearward end, the container defining a first and a second edge. The arrangement is such that when the container is located above the chassis, the first and second ends and the first and second sides of the chassis cooperate with respectively the forward and rearward ends and the first and second edges respectively of the container so that when the chassis and the container are aligned relative to each other, the chassis and the container define a first, second, third and fourth corner.

The stabilizing means includes an arm having a first and a second extremity, the first extremity being secured to the chassis. The second extremity of the arm is secured to the container.

The restraining means includes tie bolt means extending from the chassis to the container for limiting vertical movement of the container relative to the chassis.

More specifically, the restraining means include a first, second, third and fourth tie bolt secured to the container adjacent to respectively the first, second, third and fourth corners.

Each of the tie bolts slidably extend through corresponding first, second third and fourth holes defined by the chassis adjacent to respectively the first, second, third and fourth corners.

Additionally, the tie bolts respectively define first, second, third and fourth heads for limiting the movement of the container upwardly away from the chassis.

Preferably, the weight sensing means includes a weighing transducer disposed adjacent to each of the corners, with each of the weighing transducers being positioned between the chassis and the container for weighing the load.

A coupling means extending between the chassis and the container assists in the prevention of skewing of the container relative to the chassis while permitting movement of the container towards and away from the chassis.

More specifically, the coupling means is a telescopic coupling which includes a first portion rigidly secured to the chassis and a second portion slidably cooperating with the first portion. The second portion is rigidly secured to the container. The arrangement is such that in combination with the stabilizing means, the cooperating portions inhibit skewing of the container relative to the chassis so that sensing of the weight of the feed or other materials and the container by the weighing transducer is permitted.

In one embodiment of the present invention, the coupling means has one of the portions of tubular configuration, the other portion being a ball joint which is slidably disposed within the portion of tubular configuration.

In another embodiment of the present invention, one of the portions is of tubular configuration while the other portion includes a roller means slidably disposed within the portion of tubular configuration for rolling therein.

In a preferred embodiment of the present invention, the coupling means has one of the portions secured to the chassis, the portion being a rod which slides within a bearing block secured within a tubular housing secured to the container.

Many variations and modifications of the present invention will become readily apparent to those skilled in the art by a consideration of the detailed description contained hereinafter taken in conjunction with the annexed drawings. However, such modifications and variations fall within the spirit and scope of the present invention as defined by the appended claims.

BRIEF DESCRIPTION OF THE DRAWINGS

Similar reference characters refer to similar parts throughout the drawings.

Detailed Description of the Drawings

Figure 1:
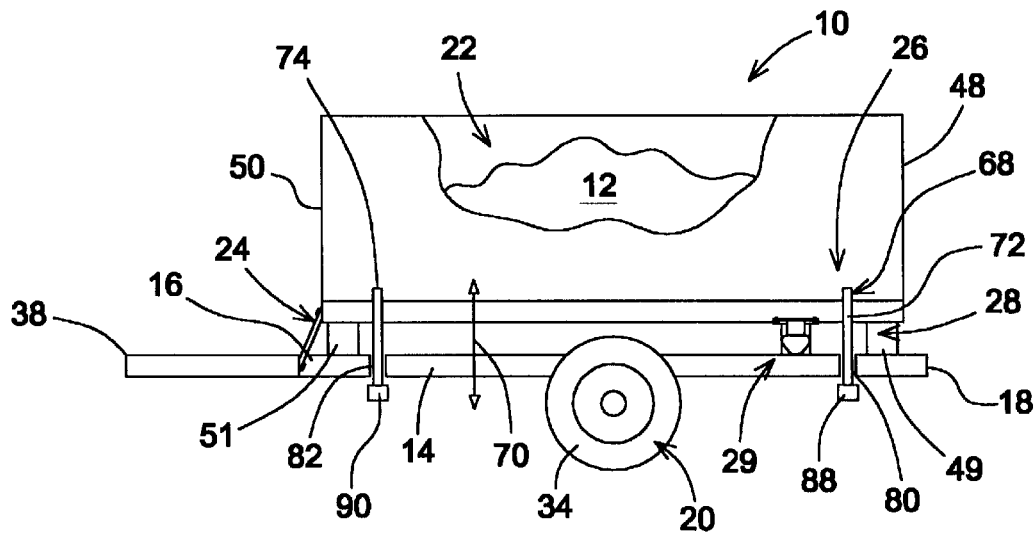
FIG. 1 is a side elevational view of an apparatus according to the present invention.

FIG. 1 is a side elevational view of a material supporting apparatus generally designated 10 according to the present invention. The apparatus 10 may be a mixer for mixing feed 12 for livestock. The apparatus 10 includes a chassis 14 having a first and a second end 16 and 18 respectively and at least one pair of wheels generally designated 20 rotatably connected to the chassis 14 for permitting transportation of the chassis 14. A feed container 22 is mounted upon the chassis 14, the arrangement being such that in use of the apparatus 10, when the feed 12 is fed into the feed container 22, mixing of the feed 12 within the container 22 to a predetermined constituency is permitted.

A stabilizing means generally designated 24 is interconnected between the feed container 22 and the chassis 14, the stabilizing means 24 being disposed between the feed container 22 and the chassis 14 for stabilizing the feed container 22 relative to the chassis 14.

A restraining means generally designated 26 extends between the chassis 14 and the feed container 22 for permitting limited vertical movement of the feed container 22 relative to the chassis 14.

Also, a weight sensing means generally designated 28 is disposed between the feed container 22 and the chassis 14 for sensing the weight of the feed container 22 and the feed 12 added thereto and for determining therefrom the weight of the feed 12 within the feed container 22.

Additionally, the mixer apparatus 10 includes coupling means generally designated 29 disposed between the chassis 14 and the container 22 and remote from the stabilizing means 24.

Chassis

Figure 2:
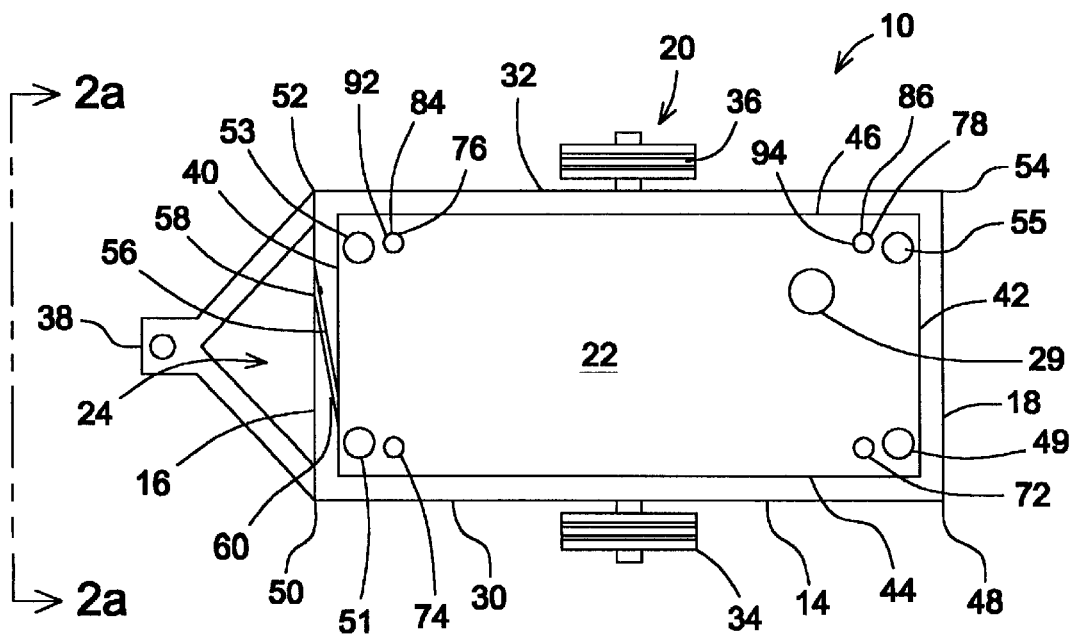
FIG. 2 is a top plan view of the apparatus shown in FIG. 1.
Figure 2A:
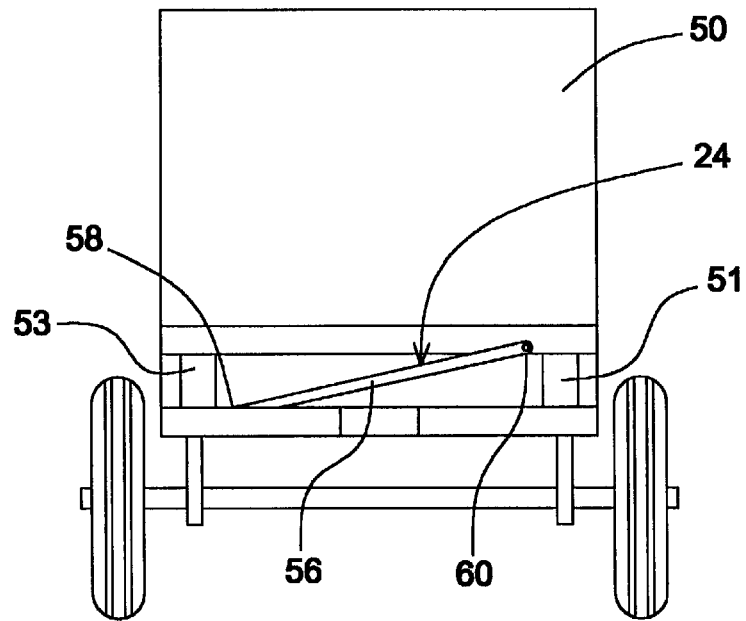

FIG. 2 is a top plan view of the mixer apparatus 10 shown in FIG. 1. As shown in FIG. 2, the chassis 14 is of generally rectangular configuration, the chassis 14 defining a first side 30 and defining a second side 32 disposed opposite to the first side 30.

Wheels

Additionally, the at least one pair of wheels 20 is disposed between the ends 16 and 18 of the chassis 14 with the at least one pair of wheels 20 including at least a first wheel 34 disposed adjacent to the first side 30 of the chassis 14.

At least a second wheel 36 is disposed adjacent to the second side 32 of the chassis 14 for enhancing the maneuverability of the mixer apparatus 10.

The mixer apparatus 10 further includes a tongue 38 extending from the first end 16 of the chassis 14. The arrangement is such that when the tongue 38 is connected to a tractor, (not shown), transportation of the chassis 14 and container 22 is permitted.

Container

Also, the feed container 22 is of a generally rectangular configuration having a forward end 40 and a rearward end 42, the container 22 defining a first and a second edge 44 and 46 respectively. The arrangement is such that when the feed container 22 is located above the chassis 14, a s shown in FIG. 1, the first and second ends 16 and 18 and the first and second sides 30 and 32 of the chassis 14 cooperate with respectively the forward and rearward ends 40 and 42 and the first and second edges 44 and 46 of the feed container 22 so that when the chassis 14 and the feed container 22 are aligned relative to each other, the chassis 14 and the container 22 define a first, second, third and fourth corner 48, 50, 52 and 54 respectively.

Stabilizing Means

The stabilizing means 24 includes an arm 56 having a first and a second extremity 58 and 60 respectively, the first extremity 58 being secured to the chassis 14.

The second extremity 60 of the arm 56 is secured to the container 22 for inhibiting skewing of the feed container 22 relative to the chassis 14. The arm 56 is secured between the chassis 14 and the container 22 in such a manner that the arm 56 is not disposed generally radially relative to the coupling means 29.

Restraining Means

The restraining means 26 includes tie bolt means generally designated 68 extending from the chassis 14 to the feed container 22 for limiting vertical movement as indicated by the arrow 70 of the feed container 22 relative to the chassis 14.

More specifically, the tie bolt means 68 include a first, second, third and fourth tie bolt 72, 74, 76 and 78 secured to the feed container 22 adjacent to respectively the first, second, third and fourth corners 48, 50, 52 and 54.

The tie bolts 72, 74, 76 and 78 slidably extend through corresponding first, second, third and fourth holes 80, 82, 84 and 86 defined by the chassis 14 adjacent to respectively the first, second, third and fourth corners 48, 50, 52 and 54.

The tie bolts 72, 74, 76 and 78 respectively define first, second, third and fourth heads 88, 90, 92 and 94 for limiting the travel of the feed container 22 upwardly away from the chassis 14.

Weight Sensing Means

The weight sensing means 28 includes weighing transducers 49, 51, 53, and 55 disposed respectively adjacent to corners 48, 50, 52 and 54 between the chassis 14 and the feed container 22.

Coupling Means

Figure 3:
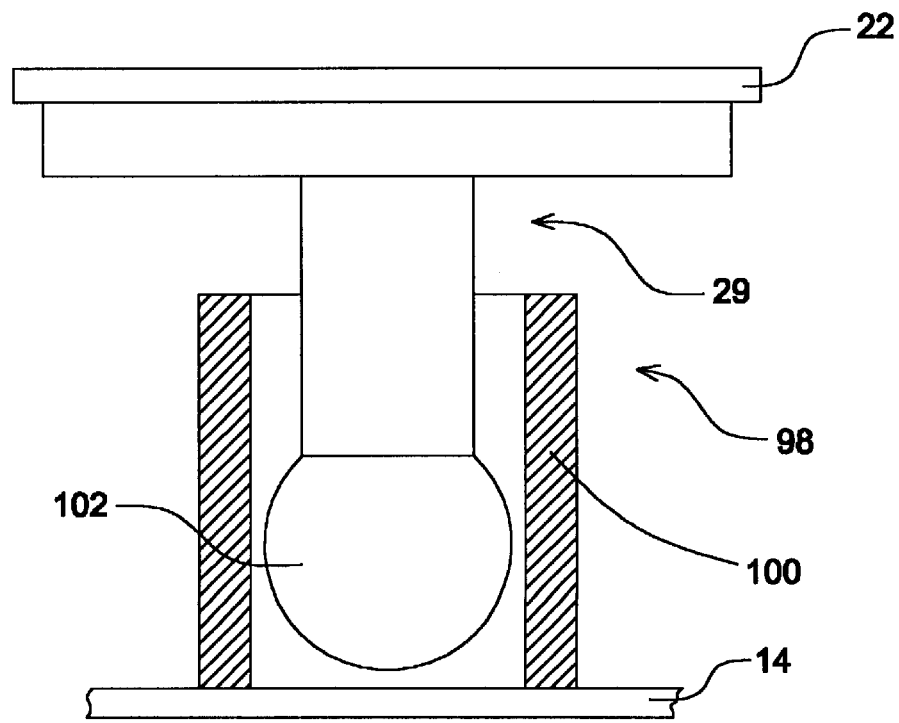
FIG. 3 is an enlarged sectional view of the coupling means shown in FIGS. 1 and 2.

FIG. 3 is an enlarged view of the coupling means. FIG. 3 shows the coupling means 29 which includes coupling generally designated 98 extending between the chassis 14 and the feed container 22 for assisting in preventing skewing of the feed container 22 relative to the chassis 14 while permitting movement of the feed container 22 towards and away from the chassis 14.

The coupling means 98 as shown in FIG. 3 is a telescopic coupling which includes a first portion 100 rigidly secured to the chassis 14 and a second portion 102 slidably cooperating with the first portion 100. The second portion 102 is rigidly secured to the feed container 22. The arrangement is such that in combination with the stabilizing means 24, the cooperating portions 100 and 102 inhibit skewing of the feed container 22 relative to the chassis 14 so that sensing the weight of the feed 12 within the container 22 by the weighing transducers 49, 51, 53 and 55 is achieved.

In one embodiment of the present invention as shown in FIG. 3, one of the portions such as 100 is of tubular configuration and the other portion 102 is a ball joint which is slidably disposed within the portion 100 of tubular configuration.

Figure 4:
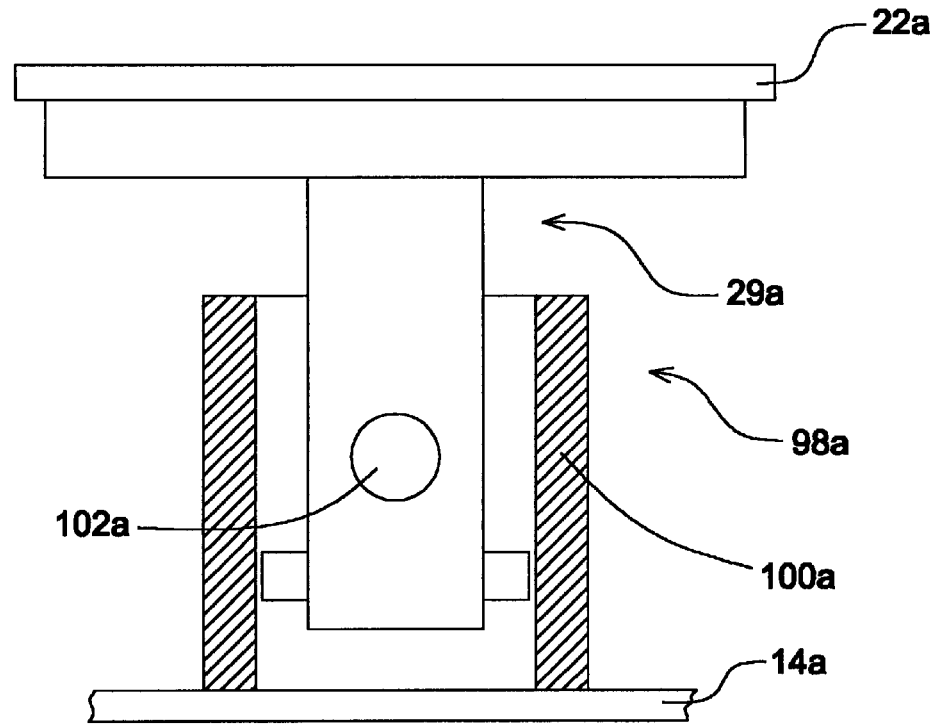
FIG. 4 is an enlarged sectional view of a coupling means of another embodiment of the present invention.

In another embodiment of the present invention as shown in FIG. 4, one of the portions such as 100a is of tubular configuration while the other portion such as 102a includes a roller means slidably disposed within the portion 100a of tubular configuration for rolling therein.

Figure 5:
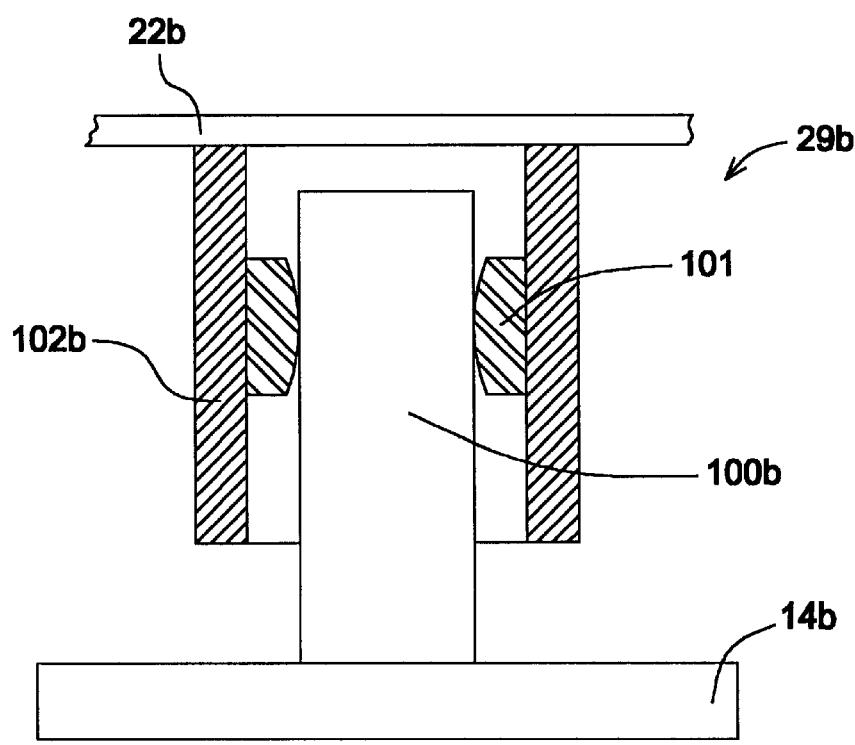
FIG. 5 is an enlarged sectional view of a coupling means of a further embodiment of the present invention.

In a further embodiment of the present invention as shown in FIG. 5, one of the portions 100b which is secured to the chassis 14b is a rod which slides within a bearing block 101 secured within a tubular housing 102b secured to the container 22b.

The apparatus according to the present invention is simple in construction when compared to the prior art means for weighing a load.

What is claimed is:

1. A material supporting apparatus for supporting and permitting delivery of materials, said apparatus comprising:

a chassis having a first and a second end;

a load container mounted upon said chassis for containing and permitting delivery of the materials;

stabilizing means interconnected between said container and said chassis, said stabilizing means being disposed between said container and said chassis for stabilizing said container relative to said chassis;

restraining means extending between said chassis and said container for permitting limited movement of said container relative to said chassis;

weight sensing means disposed between said container and said chassis for sensing the weight of said container and the materials added thereto and for determining therefrom the weight of the materials within said container;

coupling means disposed between said chassis and said container and positioned remote from said stabilizing means for assisting said stabilizing of said container relative to said chassis;

said coupling means including:

a coupling extending between said chassis and said container for assisting in preventing linear movement in a generally horizontal plane of said container relative to said chassis while permitting movement of said container towards and away from said chassis;

said coupling means being a telescopic coupling which includes:

a first portion rigidly secured to said chassis;

a second portion slidably cooperating with said first portion, said second portion being rigidly secured to said container, the arrangement being such that in combination with said stabilizing means, said cooperating portions inhibit skewing of said container relative to said chassis so that sensing of the weight of the materials and said container is permitted;

one of said portions being of tubular configuration; and one of said portions being a ball joint which is slidably disposed within said portion of tubular configuration.

2. A material supporting apparatus for supporting and permitting delivery of materials, said apparatus comprising:

a chassis having a first and a second end;

a load container mounted upon said chassis for containing and permitting delivery of the materials;

stabilizing means interconnected between said container and said chassis, said stabilizing means being disposed between said container and said chassis for stabilizing said container relative to said chassis;

restraining means extending between said chassis and said container for permitting limited movement of said container relative to said chassis;

weight sensing means disposed between said container and said chassis for sensing the weight of said container and the materials added thereto and for determining therefrom the weight of the materials within said container;

coupling means disposed between said chassis and said container and positioned remote from said stabilizing means for assisting said stabilizing of said container relative to said chassis;

said coupling means including:
 a coupling extending between said chassis and said container for assisting in preventing linear movement in a generally horizontal plane of said container relative to said chassis while permitting movement of said container towards and away from said chassis;
 said coupling means being a telescopic coupling which includes:
a first portion rigidly secured to said chassis;
a second portion slidably cooperating with said first portion, said second portion being rigidly secured to said container, the arrangement being such that in combination with said stabilizing means, said cooperating portions inhibit skewing of said container relative to said chassis so that sensing of the weight of the materials and said container is permitted;
one of said portions being of tubular configuration;
said one portion including:
 a convex shaped bearing having a throat shaped opening therein; and
 another of said portions being slidably disposed within said throat shaped opening.

3. A material supporting apparatus as set forth in claim 1 wherein
 said chassis is of generally rectangular configuration, said chassis defining a first side and defining a second side disposed opposite to said first side.

4. A material supporting apparatus as set forth in claim 3 further including:
 at least one pair of wheels disposed between said ends of said chassis, said at least one pair of wheels including:
  at least a first wheel disposed adjacent to said first side of said chassis;
  at least a second wheel disposed adjacent to said second side of said chassis for enhancing the maneuverability of said apparatus.

5. A material supporting apparatus as set forth in claim 1 further including:
 a tongue extending from said first end of said chassis, the arrangement being such that when said tongue is connected to a tractor, transportation of said chassis is permitted.

6. A material supporting apparatus as set forth in claim 3 wherein
 said container is of a generally rectangular configuration having a forward end and a rearward end, said container defining a first and a second edge, the arrangement being such that when said container is located above said chassis, said first and second ends and said first and second sides of said chassis cooperate with respectively said forward and rearward ends and said first and second edges of said container so that when said chassis and said container are aligned relative to each other, said chassis and said container define a first, second, third and fourth corner.

7. A material supporting apparatus as set forth in claim 6 wherein
 said stabilizing means includes:
  an arm having a first and a second extremity, said first extremity being secured to said chassis;
  said second extremity of said arm being secured to said container the arrangement being such that said arm permits vertical movement of said container relative to said chassis while inhibiting relative rotation between said container and said chassis.

8. A material supporting apparatus as set forth in claim 1 wherein
 said restraining means includes:
  means extending from said chassis to said container for limiting vertical movement of said container relative to said chassis.

9. A material supporting apparatus as set forth in claim 6 wherein
 said restraining means includes:
  tie bolt means extending from said chassis to said container for limiting vertical movement of said container relative to said chassis;
  said tie bolt means including:
 a first, second, third and fourth tie bolt secured to said feed container adjacent to respectively said first, second, third and fourth corners;
 said tie bolts slidably extending through corresponding first, second third and fourth holes defined by said chassis adjacent to respectively said first, second, third and fourth corners;
 said tie bolts respectively defining first, second, third and fourth heads for limiting said movement of said container upwardly away from said chassis.

10. A material supporting apparatus as set forth in claim 1 wherein
 said weight means includes:
  a weighing transducer.

11. A material supporting apparatus as set forth in claim 1 wherein
 said coupling means includes:
  a coupling extending bet ween said chassis and said container for assisting in preventing linear movement in a generally horizontal plane of said container relative to said chassis while permitting movement of said container towards and away from said chassis.

12. A material supporting apparatus as set forth in claim 11 wherein
 said coupling means is a telescopic coupling which includes:
  a first portion rigidly secured to said chassis;
  a second portion slidably cooperating with said first portion, said second portion being rigidly secured to said container, the arrangement being such that in combination with said stabilizing means, said cooperating portions inhibit skewing of said container relative to said chassis so that sensing of the weight of the materials and said container is permitted.

* * * * *